US012048934B2

(12) United States Patent
Aumund

(10) Patent No.: US 12,048,934 B2
(45) Date of Patent: Jul. 30, 2024

(54) DEVICE FOR TREATMENT OF A MATERIAL MIXTURE COMPRISING OF SUBSTITUTE FUEL AND IMPURITIES

(71) Applicant: Aumund Fördertechnik GmbH, Rheinberg (DE)

(72) Inventor: Franz Walter Aumund, Duisburg (DE)

(73) Assignee: Aumund Fördertechnik GmbH, Rheinberg (DE)

( * ) Notice: Subject to any disclaimer, the term of this patent is extended or adjusted under 35 U.S.C. 154(b) by 196 days.

(21) Appl. No.: 17/185,075

(22) Filed: Feb. 25, 2021

(65) Prior Publication Data

US 2021/0260594 A1 Aug. 26, 2021

(30) Foreign Application Priority Data

Feb. 25, 2020 (EP) .................................... 20159298

(51) Int. Cl.

| | |
|---|---|
| ***B02C 23/30*** | (2006.01) |
| ***B02C 13/14*** | (2006.01) |
| ***B02C 13/16*** | (2006.01) |
| ***B02C 13/18*** | (2006.01) |
| ***B02C 13/284*** | (2006.01) |
| ***B02C 23/16*** | (2006.01) |

(52) U.S. Cl.

CPC .............. *B02C 23/30* (2013.01); *B02C 13/14* (2013.01); *B02C 13/16* (2013.01); *B02C 13/18* (2013.01); *B02C 13/284* (2013.01); *B02C 23/16* (2013.01)

(58) Field of Classification Search

CPC ....... B02C 13/14; B02C 13/16; B02C 13/284; B02C 23/16; B02C 23/30

See application file for complete search history.

(56) References Cited

U.S. PATENT DOCUMENTS

| | | | | |
|---|---|---|---|---|
| 1,636,033 A * | 7/1927 | Agnew | B02C 13/14 | 241/154 |
| 1,758,010 A * | 5/1930 | Pettinos | B02C 13/14 | 241/185.5 |
| 2,290,379 A * | 7/1942 | Peterson | B02C 13/288 | 241/185.5 |

(Continued)

FOREIGN PATENT DOCUMENTS

| | | | |
|---|---|---|---|
| CN | 207533374 U | 6/2018 | |
| DE | 102015005604 | * 11/2016 | B02C 13/18 |

(Continued)

OTHER PUBLICATIONS

Office Action from Chinese Application No. 202110210157.7 dated Apr. 10, 2024, 14 pages.

*Primary Examiner* — Faye Francis

(74) *Attorney, Agent, or Firm* — Calfee, Halter & Griswold LLP

(57) ABSTRACT

Disclosed herein is a device for treatment of a material mixture that includes substitute fuel and impurities, where the device has a vertically aligned central feeder (1), a separating device (2) arranged underneath the central feeder (1), a rotor mill (3), wherein the rotor mill (3) is arranged above the separating device (2) and surrounds the central feeder (1), a flow device (4) for generating an upwardly directed gas flow, wherein the rotor mill (3) has several tools (8*a*, 8*b*) arranged offset relative to each other vertically and in the circumferential direction.

9 Claims, 3 Drawing Sheets

(56) References Cited

U.S. PATENT DOCUMENTS

Figure 1:
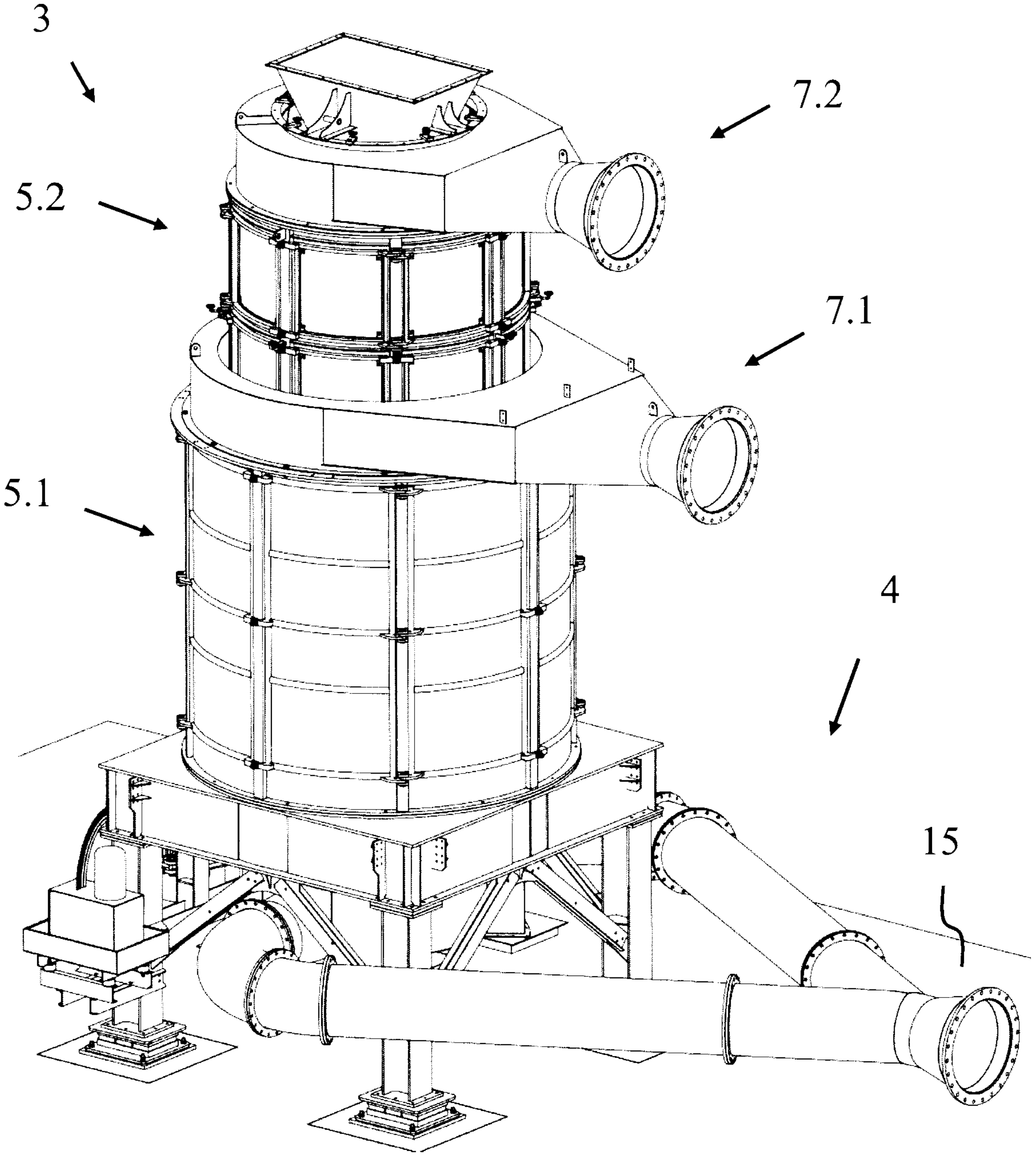

| | | | | | |
|---|---|---|---|---|---|
| 2,329,910 | A * | 9/1943 | Johnson | B02C 13/14 241/74 |
| 2,695,755 | A * | 11/1954 | Denovan | B02C 13/28 241/4 |
| 2,700,511 | A * | 1/1955 | Denovan | B02C 13/14 241/154 |
| 3,003,707 | A | 10/1961 | Lecher | |
| 3,210,015 | A * | 10/1965 | Tollemache | B02C 13/14 209/642 |
| 3,226,045 | A * | 12/1965 | Shelton, Jr. | B02C 13/16 241/185.5 |
| 6,543,709 | B2 * | 4/2003 | Huang | B02C 23/12 241/19 |
| 2008/0251618 | A1 * | 10/2008 | Gronholz | B02C 13/14 241/161 |
| 2015/0048187 | A1 * | 2/2015 | Gronholz | B02C 13/28 241/27 |
| 2015/0314296 | A1 * | 11/2015 | Lindner | B02C 13/282 241/261.2 |
| 2020/0269252 | A1 * | 8/2020 | Bano | B02C 13/282 |
| 2020/0269253 | A1 * | 8/2020 | Bano | B02C 13/288 |

FOREIGN PATENT DOCUMENTS

| | | | | |
|---|---|---|---|---|
| DE | 102015005604 | A1 | 11/2016 | |
| DE | 102016110086 | * | 12/2017 | B02C 13/14 |

* cited by examiner

DEVICE FOR TREATMENT OF A MATERIAL MIXTURE COMPRISING OF SUBSTITUTE FUEL AND IMPURITIES

The present invention relates to a method for treatment of a material mixture consisting of substitute fuel and impurities, which is sifted, comminuted, and dried in the device.

Also referred to as a secondary fuel, the substitute fuel in particular comprises solid waste, which together with conventional fuels can be used primarily in cement, lime, lignite, or industrial power plants, as well as in incineration plants or as the sole fuel in substitute fuel power plants. The solid waste consisting of commercial waste and/or household waste, for example, usually still has impurities such as glass or metals after a coarse comminution. After the coarse comminution, it is thus known to perform a separation, and if necessary further comminute the substitute fuel.

Therefore, the object of the invention is to indicate a device which both enables a separation of the impurities from the substitute fuel and allows the generation of the substitute fuel with a varying average size of the substitute fuel particles.

The object is achieved by a device with the features of the independent claim. Advantageous further embodiments of the device are indicated in the dependent claims and in the specification, wherein individual features of the advantageous further embodiment can be combined with each other in a technical sensible manner.

The object is achieved by a device for treatment of a material mixture consisting of a substitute fuel and impurities, having a vertically aligned central feeder, a separating unit arranged underneath the central feeder, a rotor mill, wherein the rotor mill is arranged above the separating unit and surrounds the central feeder, and a flow device for generating an upwardly directed gas flow, wherein the material mixture can be introduced into the feeder, and sinks to the separating unit after introduction into the feeder, wherein the impurities in the separating unit are at least partially separated from the material mixture as an impurity fraction, and the material mixture separated from the separated impurities rises with the gas flow to the rotor mill, wherein the rising material mixture is comminuted in the rotor mill. It is also provided that the rotor mill has several tools arranged offset relative to each other vertically and in the circumferential direction.

For example, the material mixture can be introduced into the feeder via a funnel or some other dispensing device, wherein the feeder is vertically aligned, so that the material mixture introduced into the feeder sinks in the feeder. The feeder is thus hollow inside, so that the material mixture can sink unimpeded. For example, the feeder can be formed by a pipe (hollow cylinder)

Arranged underneath the central feeder is a separating unit, which for example comprises a rotatably drivable spreading plate. In particular, the separating unit is designed in such a way that at least a large percentage of the impurities can be separated (sifted) out of the material mixture, wherein the separated impurities can be removed from the device in a suitable manner.

Also provided for separation/sifting is a flow device, by means of which an upwardly rising gas flow can be generated at least on the area of the separating unit, in particular in the area of the spreading plate of the separating unit, and of the rotor mill. To this end, the flow device in particular has at least one gas inlet preferably arranged in the lower area of the device, and at least one outlet in the upper area of the rotor mill. For example, heated air can be used as the gas.

In particular, it is here provided that the material mixture fed through the central feeder is spun from the spreading plate into a chamber surrounding the spreading plate, in which the gas flow rises, wherein the rising gas flow preferably only entrains the substitute fuel, and a large part of the impurities sinks in the chamber surrounding the spreading plate. The entrained substitute fuel is then also dried with the gas flow.

The substitute fuel entrained by the gas flow (and possibly unseparated impurities) is fed with the gas flow to the rotor mill, which is arranged above the separating unit (spreading plate). The substitute fuel is comminuted in the rotor mill through impact, shear and rebound forces. To this end, the rotor mill preferably has at least one rotary driven tool, which facilitates the comminution of the substitute fuel.

The separating unit (and in particular its spreading plate) and the tools of the rotor mill can preferably be together rotationally (rotatory) driven around a vertically aligned axis. At the same time, it is especially preferable that the feeder is also rotationally drivable. The spreading plate can here be non-rotatably connected with the element bordering the feeder (e.g., a pipe), wherein the at least one tool of the rotor mill is preferably secured to an exterior side of the element that forms the central feeder within its interior. As a consequence, only one drive need be provided for generating the rotational movement. In particular, the drive is arranged in the lower area of the device, and for example can generate a rotational movement with 500 to 1000, preferably with 700 to 900 revolutions/min.

The invention additionally provides that the rotor mill (and in particular also each stage of the rotor mill) has several, in particular more than 10, preferably more than 20, tools arranged offset relative to each other vertically and in the circumferential direction. This offset arrangement of adjacent tools in both a circumferential direction and in a vertical direction yields a higher retention time of the material mixture, and hence a more effective comminution of the material mixture, so that a higher comminution level can be reached, or the rotor mill can be realized with a smaller height. However, the higher retention time also results in an improved drying of the material mixture.

In this conjunction, it is preferred that the rotor mill has a centrally arranged and rotationally driven hollow cylinder (which preferably also forms the central feeder), the exterior side of which has secured to it the tools, wherein the tools each individually extend radially outward from the exterior side of the hollow cylinder. The tools are thus in particular elements with an oblong design, which extend outwardly from the hollow cylinder. As a consequence, in particular the entire area between the exterior side of the hollow cylinder and a boundary of the rotor mill spaced radially apart from the latter can thus carry a flow of the rising material mixture, wherein an interaction can take place with the tools in the entire area.

It can here be provided that a group of tools and/or most tools comprise flat wing elements, which extend radially outward. The wing elements are indirectly or directly secured to the exterior side of the hollow cylinder, and are significantly (at least three times, preferably at least five times) longer in a radial direction than their width. In addition, the wing elements have a height that is smaller than their width, wherein the wing elements are at least twice, preferably four times as wide as high. It was found that such winglike elements enable an especially efficient comminution of the material mixture.

A further improvement of comminution can be achieved by setting the wing elements at an angle to a horizontal plane. The angle of attack preferably measures 3° to 45°, especially preferably 5° to 20° relative to the horizontal plane.

It can further be provided that at least one tool or a plurality of tools, preferably a majority of tools, comprise a platelike impact element, which is arranged at a radial end of the tool, wherein the platelike impact element is in particular vertically aligned. Such a platelike impact element can be used to further increase the comminution efficiency.

In addition, it can be provided that at least one tool comprise a scraper element, which is arranged radially outward on the tool, and abuts against a wall of the rotor mill that outwardly borders the milling chamber or the stage of the rotor mill, wherein the wall can be formed by a grid arrangement, for example, which separates the milling chamber from an annular chamber. Therefore, the scraper element can be used to prevent or remove an accumulation of particles of the material mixture on the interior side of the wall.

For example, the platelike impact element or the scraper element can be secured to a radial end of the wing element of the tool described above.

It can also be provided that at least one tool be formed out of a wire that is secured to the exterior side of the hollow cylinder. A wire is understood in particular as an element which extends outwardly from the hollow cylinder in an oblong manner, and whose width and height are roughly identical. The wire preferably has a circular cross sectional design.

A plurality (in particular more than 8, preferably more than 16) of tools that each comprise a wing element is preferably arranged in a lower area of the rotor mill or in a lower area of a stage of the rotor mill, while several tools comprising a wire are arranged in an upper area of the rotor mill or in an upper area of a stage of the rotor mill.

To achieve an especially efficient comminution of the material mixture, it was found that a group (more than 4) of tools can be arranged helically offset relative to each other (i.e., on a helical curve), wherein several groups of tools can be arranged one behind the other in a circumferential direction.

An embodiment can provide that the rotor mill has a multistage design, i.e., at least and preferably have exactly two or three stages, possibly four stages, wherein at least one separating device (for example a sieve) is arranged between the respective stages of the rotor mill, wherein material mixture not held back by the separating device is further comminuted in the following stage, wherein in particular particles of the material mixture containing predominantly substitute fuel having a particle size greater than prescribed by the separating device are held back in the preceding stage, while particles of the material mixture with a smaller size can get into the following stage. The material mixture is then further comminuted in the following stage of the rotor mill. Given the multistage configuration of the rotor mill, a device can be used to provide substitute fuel with a different average particle size. For example, the fraction of the material mixture removed from the first stage can have an average particle size of between 60 and 200 mm, while the fraction of the material mixture removed from the second stage can have an average particle size of between 10 and 60 mm, for example.

In this conjunction, it is preferred that each stage of the rotor mill be allocated at least one outlet, through which the correspondingly comminuted material mixture containing mainly or best of all exclusively substitute fuel can be removed.

The second and if necessary each additional stage of the rotor mill are arranged in particular vertically above the first or preceding stage, wherein the tools of each stage are preferably driven by a single shared drive.

While it is possible in principle to realize the separating device with suitable separating processes, it is preferred that the separating device comprise at least one respective sieve between the stages of the rotor mill. This type of sieve yields a simple separating device.

An embodiment can provide that an annular chamber be formed that surrounds the first stage of the rotor mill, wherein in particular a grid arrangement that functions as a sieve is arranged between the outer annular chamber and the tools of the first stage of the rotor mill. The material mixture comminuted in the first stage of the rotor mill can thus get through the grid arrangement into the annular chamber, from which the comminuted material mixture can be removed through the at least one first outlet. If a plurality (more than two) stages are formed, each stage following the first stage except for the last stage can have allocated to it a separate annular chamber, which is separated by a grid arrangement from the tools of the corresponding stage.

In this conjunction, it can also be provided that wiper elements, which can also be referred to as scraper elements, be formed at a radially outer end of several tools of the (first stages) of the rotor mill, which can be used to detach particles of the material mixture held back on the grid arrangement or a radial wall of the rotor mill from the grid arrangement, so that they can be fed to a further comminution in the first or corresponding stage.

In addition, it can be provided that the separating device between the stages of the rotor mill have allocated to it a cleaning device, with which the material mixture held back by the separating device can be detached from the separating device. As a consequence, the detached material mixture can be fed to a further comminution in the preceding stage, to which end a pulsation of the gas flow is also possible, for example. The cleaning device together with the tools of the preceding stage can here also be rotatably driven, thereby enabling a continuous detachment of the held back material mixture from the separating device.

Figure 2:
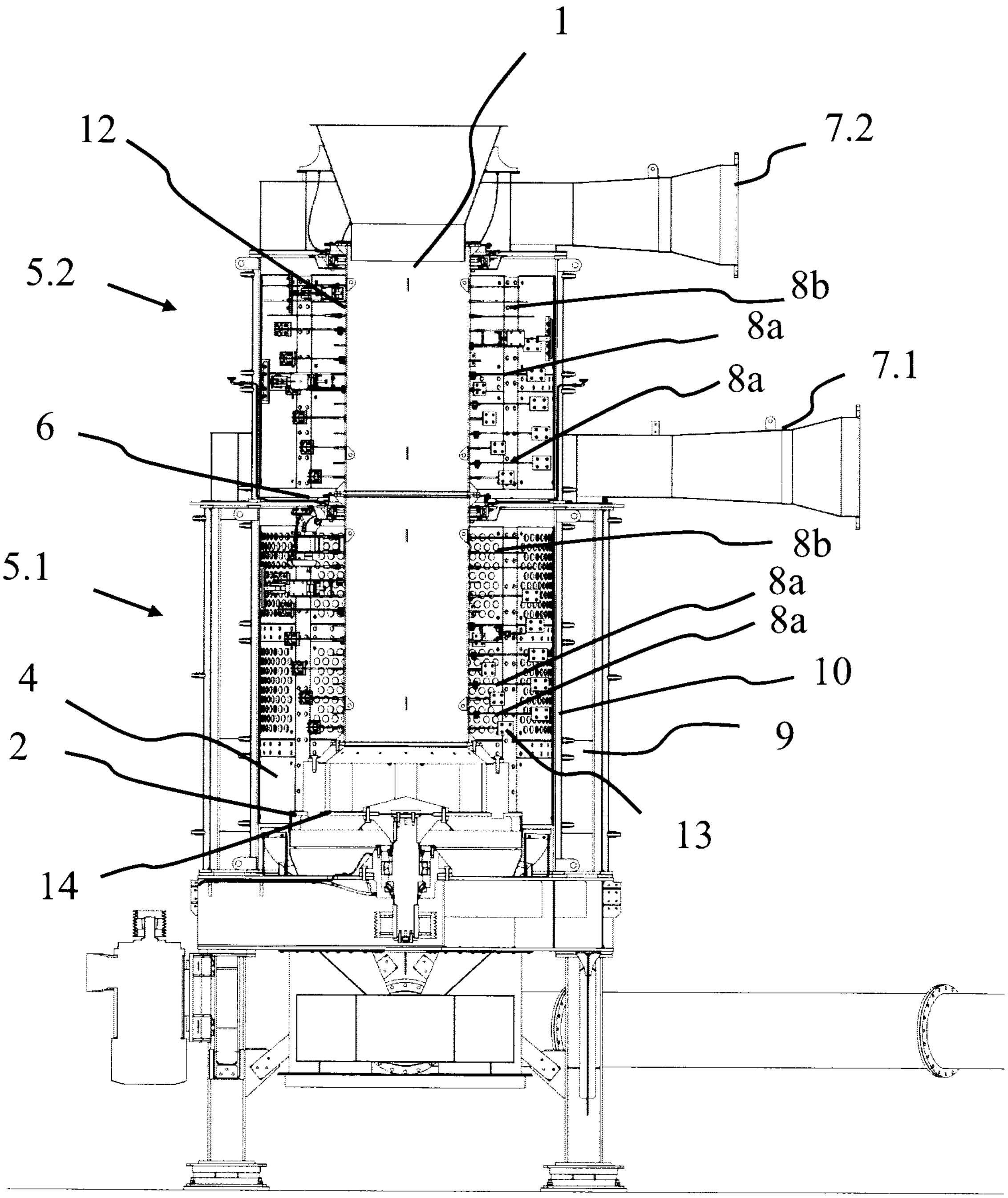
Figure 3:
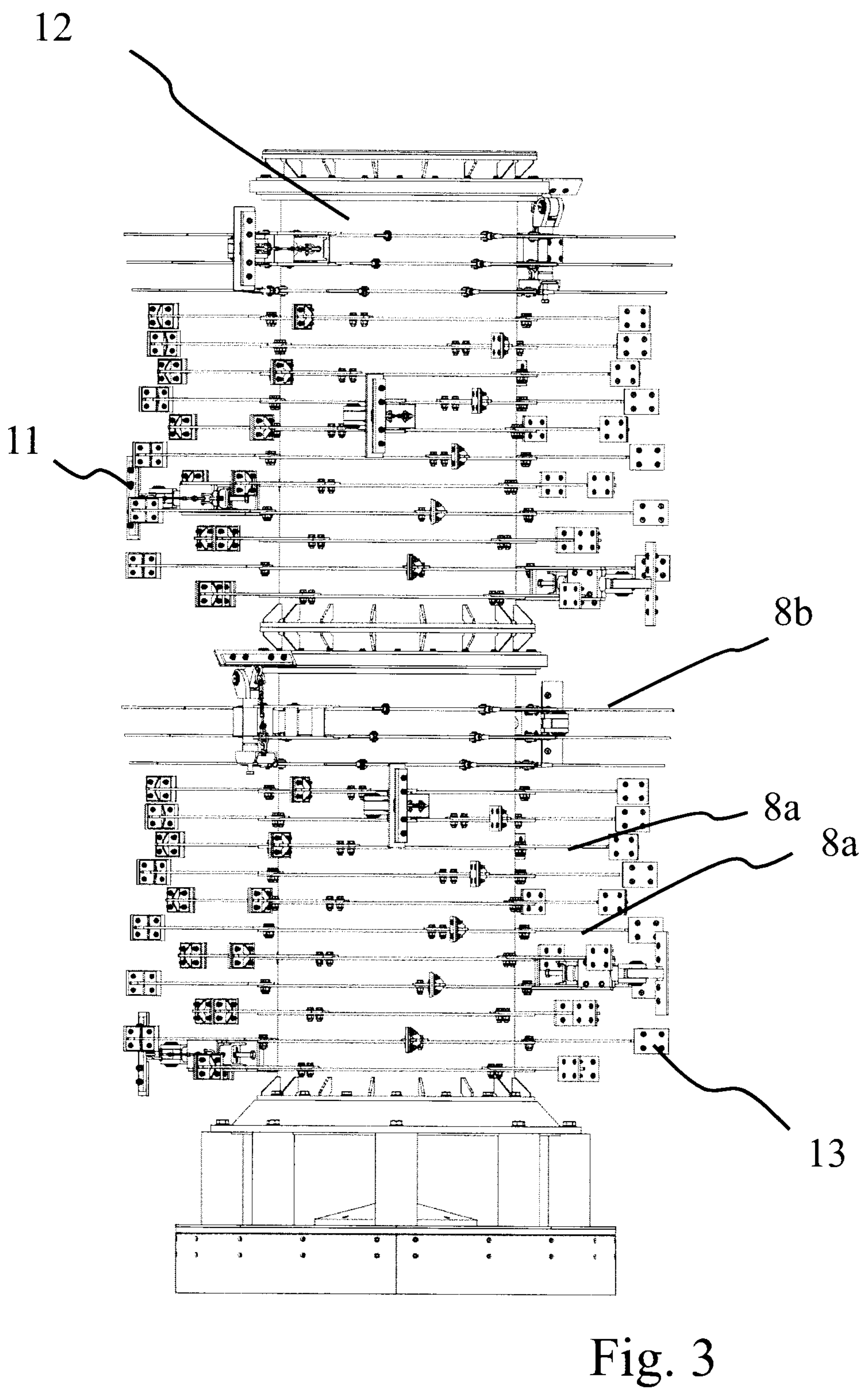

The invention along with the technical environment will be exemplarily explained below based on the figures. Schematically shown in FIG. 1: is a device for preparing a material mixture consisting of substitute fuel and impurities, FIG. 2: is a sectional view through the device, and FIG. 3: is a detailed view of the device.

The device for treatment of a material mixture consisting of substitute fuel and impurities shown on the figures has a vertically aligned feeder 1, which is radially bordered by a hollow cylinder 12. A funnel is formed above the feeder 1, through which the material mixture is introduced into the feeder 1.

A separating unit 2 is formed underneath the central feeder 1, and comprises a spreading plate 14. The spreading plate 14 is non-rotatably connected with the hollow cylinder 12, so that the spreading plate 14 and the hollow cylinder 12 can together be rotatably driven.

Tools are arranged on the exterior side of the hollow cylinder 12 in the form of wing elements 8*a* and wires 8*b*, so that they can be rotatably driven along with the hollow cylinder 12 around the hollow cylinder longitudinal axis. The tools 8*a*, 8*b* form a rotor mill 3 arranged above the separating unit 2.

The device also comprises a flow device 4 with an inlet 15, a first outlet 7.1 and a second outlet 7.2. The flow device 4 can be operated by blowing in a gaseous operating medium at the inlet 15 or by siphoning the gaseous operating medium at the outlets 7.1 and 7.2. The interior of the device is here configured in such a way that operating medium entering through the inlet 15 flows upwardly past the radially outer edge of the spreading plate 14 and into the rotor mill 3.

The rotor mill 3 has a first stage 5.1, which is allocated to the first outlet 7.1. The rotor mill 3 also has a second stage 5.2, which is allocated to the second outlet 7.2. The tools *8a* and *8b* of the first stage 5.1 are radially surrounded by a grid arrangement 10, which separates the tools from an annular chamber 9. A separating device 6 in the form of a sieve is also formed between the first stage 5.1 and the second stage 5.2.

The first stage 5.1 and the second stage 5.2 of the rotor mill 3 each comprise a plurality of grouped wing elements *8a* helically secured to the exterior side of the hollow cylinder 12, which extend radially outward from the exterior side of the hollow cylinder. The wing elements *8a* are aligned at an angle of attack to a horizontal plane. Platelike impact elements 13 are secured to the outer ends of the wing elements *8a*. By contrast, scraper elements 11 are secured to several wing elements *8a*, and can be used to remove constituents of the material mixture held back by the grid arrangement 10 from the grid arrangement 10. In the upper area of the first stage 5.1, scraper elements can also be indirectly secured to the hollow cylinder 12 as a cleaning device, and used to remove material held back by the separating device 6. The first stage 5.1 and the second stage 5.2 each have wires *8b* as tools in the upper area, which are secured to the exterior side of the hollow cylinder 12.

During operation, a material mixture consisting of substitute fuel and impurities is introduced into the vertically aligned central feeder 1, in which the material mixture sinks down to the separating unit 2 comprising the spreading plate 14. The combined rotational movement of the spreading plate 14 and the hollow cylinder 12 bordering the feeder 1 accelerates the material mixture radially outward upon reaching the spreading plate 14 at the latest. The material mixture traversing the outer radial edge of the spreading plate 14 is sifted by the rising gas flow, so that impurities sink down in the chamber surrounding the spreading plate 14, while the remaining material mixture having primarily substitute fuel enters into the first stage 5.1 of the rotor mill 3 along with the gas flow.

In the first stage 5.1, the material mixture is comminuted through interaction with the tools *8a* and *8b* and among each other. Because the tools *8a*, *8b* are arranged offset vertically and in a circumferential direction, an effective comminution can take place, wherein comminuted material can pass through the grid arrangement 10 into the annular chamber 9, wherein this part of the material mixture is removed from the first outlet 7.1.

The material mixture passing through the separating device 6 is further comminuted in the second stage 5.2, so that the material mixture exiting the second outlet 7.2 has a smaller average particle size than the material mixture exiting the first outlet 7.1.

Therefore, the device not only allows an especially efficient comminution to take place, but can rather also be used to provide a material mixture with different particle size.

REFERENCE LIST

1 Feeder
2 Separating unit
3 Rotor mill
4 Flow device
First stage
5.2 Second stage
6 Separating device
7.1 First outlet
72 Second outlet
*8a* Wing element
*8b* Wire
0 Annular chamber
10 Grid arrangement
11 Scraper element
12 Hollow cylinder
13 Impact element
14 Spreading plate
15 Inlet

The invention claimed is:

1. A device for treatment of a material mixture comprising substitute fuel and impurities, the device having
- a vertically aligned central feeder (1),
- a separating unit (2) arranged underneath the central feeder (1),
- a rotor mill (3), wherein the rotor mill (3) is arranged above the separating unit (2) and surrounds the central feeder (1),
- a flow device (4) for generating an upwardly directed gas flow,
- wherein the material mixture is introducible into the feeder (1), and sinks to the separating unit (4) after introduction into the feeder (1), wherein in the separating unit (4) the impurities are separated at least partially from the material mixture as an impurity fraction, and the material mixture separated from the separated impurities rises with the gas flow to the rotor mill (3), wherein the rising material mixture is comminuted in the rotor mill (3), wherein the rotor mill (3) has several tools (*8a*, *8b*) arranged offset relative to each other vertically and in the circumferential direction, wherein the tools comprise flat wing elements (*8a*), which extend radially outward, and further wherein the wing elements (*8a*) are set at an angle between 3° and 45° relative to a horizontal plane.

2. The device according to claim 1, wherein the rotor mill (3) has a centrally arranged and rotationally driven hollow cylinder (12), the exterior side of which has secured to it the tools (*8a*, *8b*), wherein the tools (*8a*, *8b*) each individually extend radially outward from the exterior side of the hollow cylinder (12).

3. The device according to claim 1, wherein at least one tool in the several tools (*8a*, *8b*) comprises an impact element (13) shaped as a plate, which is arranged radially outward on the at least one tool (*8a*, *8b*), and is vertically aligned.

4. The device according to claim 1, wherein at least one tool in the several tools (*8a*, *8b*) comprises a scraper element (11), which is arranged radially outward on the at least one tool (*8a*, *8b*), and abuts against a wall (10) of the rotor mill that outwardly borders the milling chamber.

5. The device according to claim 1, wherein at least one tool in the several tools (*8a*, *8b*) is formed out of a wire (*8b*).

6. The device according to claim 1, wherein at least one group of tools (*8a*, *8b*) in the several tools (*8a*, *8b*) is helically arranged.

7. The device according to claim 1, wherein the feeder (1), the separating device (2) and the rotor mill (3) are together rotatably drivable around a vertically aligned axis.

8. The device according to claim 1, wherein the separating device (2) comprises a rotatably drivable spreading plate (14).

9. The device according to claim 8, further comprising a chamber that surrounds the spreading plate (14), wherein the chamber is configured to receive material mixture that is spun from the spreading plate, and further wherein the gas flow rises in the chamber.

* * * * *